United States Patent [19]

Galgana

[11] Patent Number: 5,006,029
[45] Date of Patent: Apr. 9, 1991

[54] RECEIVING ASSEMBLY FOR SOLID WASTE DISPOSAL SYSTEM

[75] Inventor: Russell J. Galgana, Clarksville, N.Y.

[73] Assignee: Smith & Mahoney, P.C., Albany, N.Y.

[21] Appl. No.: 384,500

[22] Filed: Jul. 24, 1989

[51] Int. Cl.⁵ .................... F23K 3/00; B65G 65/06
[52] U.S. Cl. .................... 414/327; 414/187; 414/356; 414/574; 198/497; 198/550.3; 198/550.13
[58] Field of Search ............ 414/327, 293, 299, 288, 414/303, 187, 356, 574; 198/550.01, 534, 550.9, 550.13, 579, 497, 633, 550.3; 209/658, 930

[56] References Cited

U.S. PATENT DOCUMENTS

| | | | |
|---|---|---|---|
| 1,465,050 | 8/1923 | Kinsley | 198/607 X |
| 1,535,039 | 4/1925 | Rettler | 414/327 |
| 2,362,677 | 11/1944 | Stephens | 198/579 |
| 2,428,852 | 12/1943 | Muir et al. | 198/550.01 X |
| 3,013,675 | 12/1961 | Schonrock | 414/293 |
| 4,020,956 | 5/1977 | Van Hille | |
| 4,602,572 | 7/1986 | Giaier et al. | |
| 4,740,127 | 4/1988 | Galgana et al. | |
| 4,825,996 | 5/1989 | Davidts | 198/497 |
| 4,838,409 | 6/1989 | Rappen | 198/497 |
| 4,925,008 | 5/1990 | Blosser | 198/497 |

FOREIGN PATENT DOCUMENTS

| | | | |
|---|---|---|---|
| 1303647 | 8/1961 | France | 198/497 |
| 62-4124 | 1/1987 | Japan | 198/497 |
| 1083957 | 4/1984 | U.S.S.R. | 414/356 |

Primary Examiner—Frank E. Werner
Assistant Examiner—Scott L. Lowe
Attorney, Agent, or Firm—Hoffmann & Baron

[57] ABSTRACT

A receiving assembly for a solid waste disposal system is provided. The assembly includes a pit defined by vertical side walls and having an upper opening. An upwardly inclined receiving conveyor is positioned within the pit. An infeed conveyor includes a first end positioned beneath the discharge end of the receiving conveyor such that solid waste material is dropped by the receiving conveyor onto the infeed conveyor. A heavy curtain is suspended above the discharge end of the receiving conveyor for controlling the fall of the solid waste material onto the infeed conveyor. A second curtain is positioned between the conveyors to prevent material from falling therebetween. The infeed conveyor is operated at about twice the speed of the receiving conveyor.

20 Claims, 4 Drawing Sheets

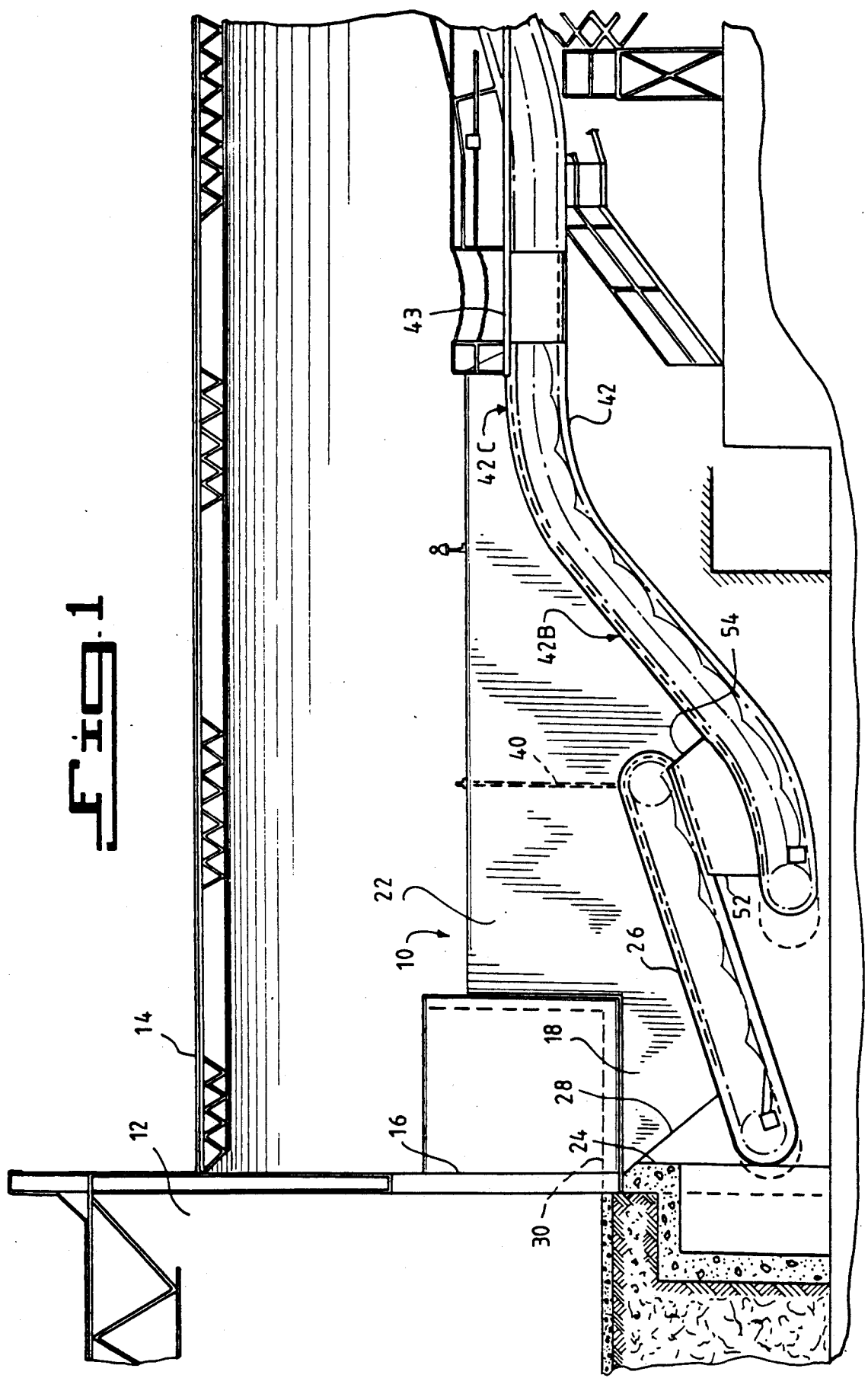

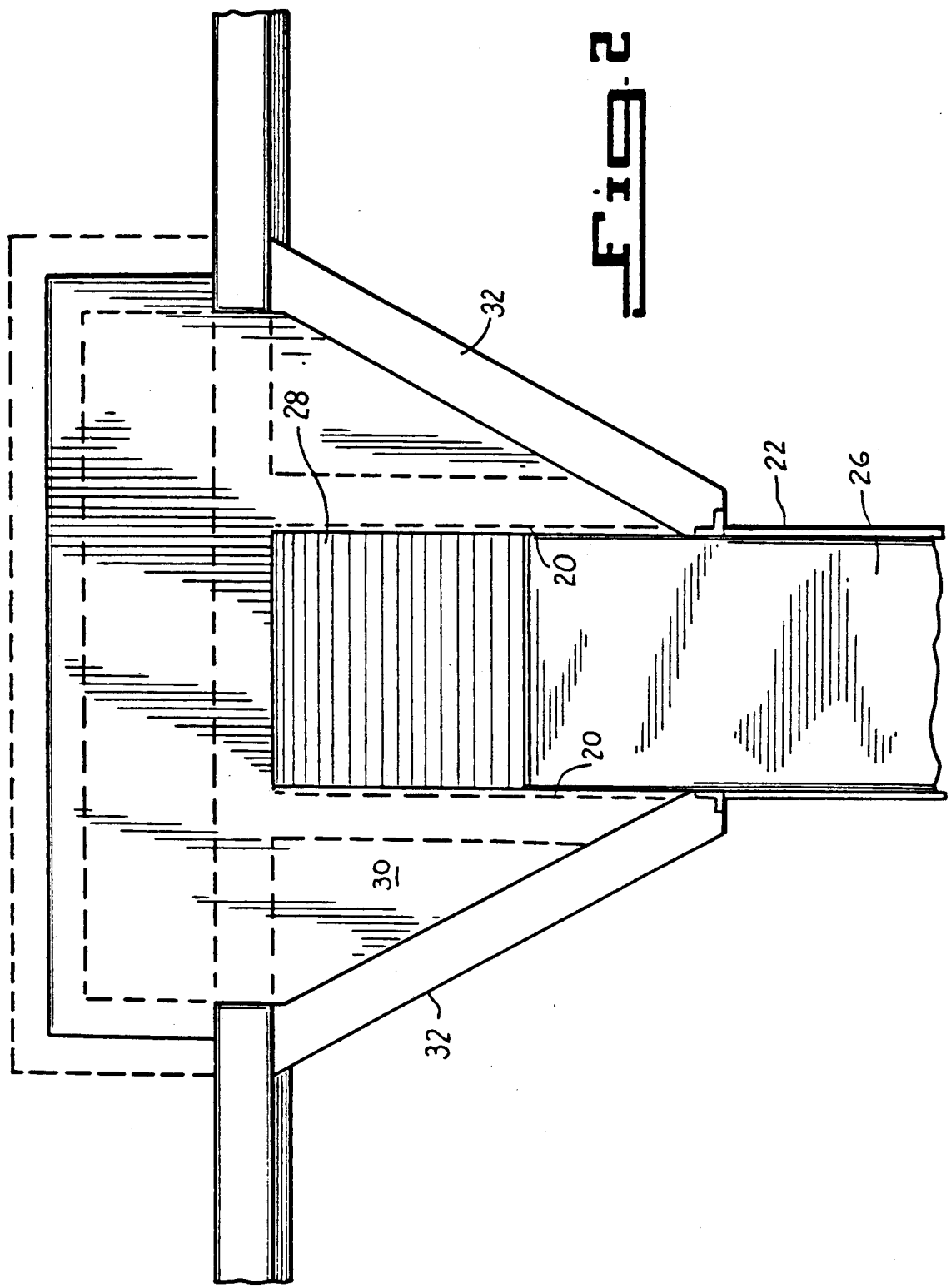

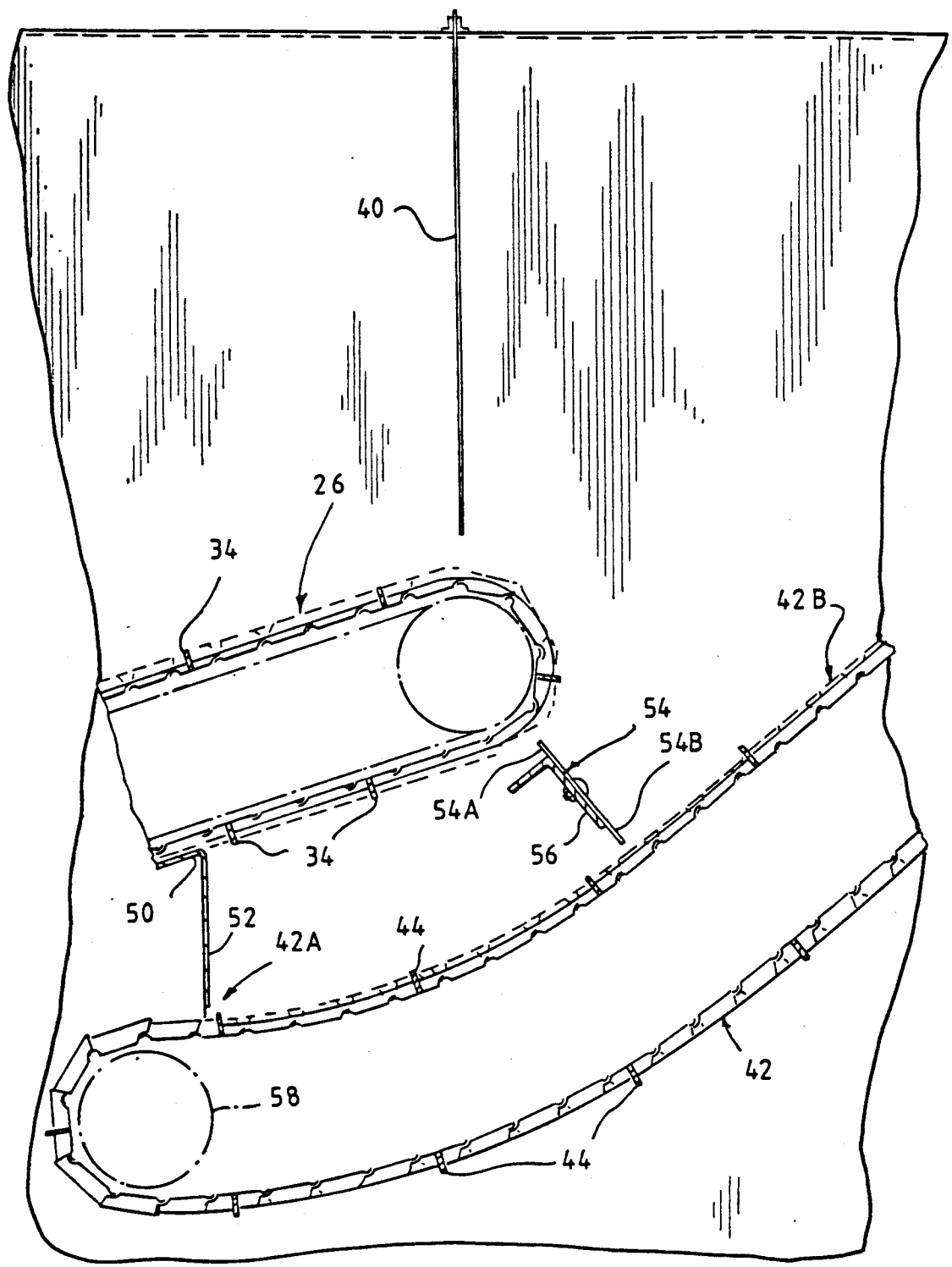

RECEIVING ASSEMBLY FOR SOLID WASTE DISPOSAL SYSTEM

BACKGROUND OF THE INVENTION

The field of the invention relates to receiving stations for receiving solid waste from trucks or other vehicles at a waste disposal facility.

Facilities for handling solid waste materials from residential and industrial sources have become increasingly important as landfills close and waste disposal sites become more difficult to locate. Such facilities are often equipped with systems for recycling certain items and incinerating much of the combustible waste materials. Incineration allows the production of steam which can be used for heating or the generation of electricity.

Solid waste facilities often include a number of stations where the solid waste is successively handled and treated. Solid waste is generally brought into a facility by trucks which deposit the waste at a receiving station. Alternatively, the waste may be dumped onto a receiving floor by trucks and transferred to the receiving station by a wheel loader, crane or equivalent means. Once deposited, the solid waste may be conveyed from the receiving station to a picking station where recyclable materials and/or materials unsuitable for subsequent shredding may be removed. The shreddable materials may then be conveyed to a shredder, where they are shredded to a size which can be readily combusted. Ferrous metals may be removed from the shredded waste material by a magnetic separator. The shredded waste material may then be conveyed to a boiler where it is combusted.

It is preferable to avoid compacting the solid waste material at the receiving station due to the difficulty of transporting such material, sorting through it for unacceptable items and then attempting to shred it. Since the receiving station is generally of pit-like configuration, and the waste material is commonly dropped into it by sanitation trucks, wheel loaders and the like, there is a tendency for the material to compact. Compaction occurs due to several causes, including but not necessarily limited to depth of storage, pit sidewall geometry (i.e. convergent), and downward compaction forces from a wheel loader.

One proposed solution to the compaction problem is the use of a live bottom pit for receiving and conveying solid waste material. One such construction is disclosed in U.S. Pat. No. 4,020,956, which discloses a pit including an endless conveyor positioned at the bottom thereof. The conveyor includes a horizontal section and an inclined section extending upwardly at an angle exceeding thirty-five degrees. The purpose of the patented construction is to shred off material from the bottom of the mass within the pit and transport the shredded mass to another station, such as a pulverizing station.

Another consideration in the design of receiving stations for solid waste materials is the safety of the operators of the vehicles which unload these materials into the pits. Barriers have conventionally been employed which will engage the tires of the vehicles prior to their reaching the edges of the pit. Such barriers if constructed high enough to stop a moving vehicle will usually allow only marginally sufficient clearance for the solid waste material to be dumped from the vehicle. In virtually all applications of vehicle barriers at dumping pits, spillage of waste on the vehicle maneuvering floor occurs and causes significant housekeeping problems.

SUMMARY OF THE INVENTION

It is an object of the invention to provide a receiving station for a waste disposal facility which receives and transports solid waste material.

It is another object of the invention to provide a conveyor assembly for transporting solid waste material while minimizing the possibility of jamming within the assembly.

A still further object of the invention is to provide a receiving station including safety features for preventing a vehicle from falling into a waste receiving pit.

A still further object of the invention is to provide a receiving station including a pit which is designed to prevent bridging, jamming or damming of solid waste material deposited thereon.

A still further object of the invention is to provide a method for handling unshreddable solid waste material in a safe and efficient manner.

In accordance with these and other objects of the invention, a receiving assembly for solid waste material is provided which includes a first conveyor having a discharge end, and a second conveyor having a portion thereof positioned beneath said first conveyor such that waste material falling from said discharge end of said first conveyor will fall upon said second conveyor, said second conveyor including an upwardly inclined section. In a preferred embodiment of the invention, the first conveyor also includes either an upwardly inclined section, or may be so inclined in its entirety.

Means are preferably provided for controlling the rate at which waste material is transported from said first conveyor to said second conveyor. Such controlling means may take the form of a flap extending downwardly towards the discharge end of said first conveyor and having an end adjacent to said first conveyor.

Barrier means are preferably provided between said first and second conveyors for preventing waste material falling onto said second conveyor from moving rearwardly and under said first conveyor. Said barrier means preferably includes a stiff, but slightly resilient curtain extending perpendicularly to a tangent line intersecting a bottom surface of said discharge end of said first conveyor. The second conveyor is preferably operated at a higher speed than the first conveyor to prevent waste material from wedging between the two conveyors and to reduce the burden depth on the second conveyor to a level commensurate with effective visual scrutiny for unacceptable items thereon.

A discharge area is provided by the invention which includes a pit defined by an end wall and an opposing pair of substantially vertical walls adjoining the end wall, a downwardly inclined ramp extending from the end wall and between the opposing pair of vertical walls, a conveyor positioned within the pit, and a substantially horizontal floor adjoining the upper end of the end wall and opposing vertical walls. A pair of side walls extending upwardly from said floor and oriented diagonally with respect to the opposing vertical walls of the pit are also provided to guide wheel loaders obliquely towards each side of the pit. The oblique approach to the pit permits using a wheel loader bucket or blade of greater width than that of the pit while still permitting all material pushed or carried by the loader to be discharged into the pit. An additional feature is that with proper choice of loader and bucket/blade dimensions, it becomes impossible to drive the loader into the pit. Instead the bucket/blade and/or the tires will straddle the pit preventing drop-in. This in turn eliminates the need for a vehicle barrier at the edge of the pit. Furthermore, by dumping solid waste material from alternate sides of the pit, the accumulation of waste material on the horizontal floor surfaces adjoining the pit can be substantially eliminated and jams, should they occur, can be reached and cleared by the wheel loader bucket. The vertical sidewalls of the pit prevent material from jamming or bridging in any areas not accessible to the wheel loader.

BRIEF DESCRIPTION OF THE DRAWINGS

FIG. 1 is a side elevation view of a receiving assembly of a waste disposal system according to the invention;

FIG. 2 is a top plan view of a tipping floor and pit at the front end of the receiving assembly;

FIG. 5 is an enlarged side elevation view illustrating the discharge end of a receiving conveyor and the front end of an infeed conveyor.

DETAILED DESCRIPTION OF THE INVENTION

A receiving assembly 10 for a solid waste disposal system is shown in FIG. 1. The receiving assembly is contained within a pair of adjoining buildings, one of which shall be referred to as the receiving building 12 and the other as the infeed building 14. A doorway or passage 16 permits entry to the infeed building 14 from the receiving building 12.

Figure 4:
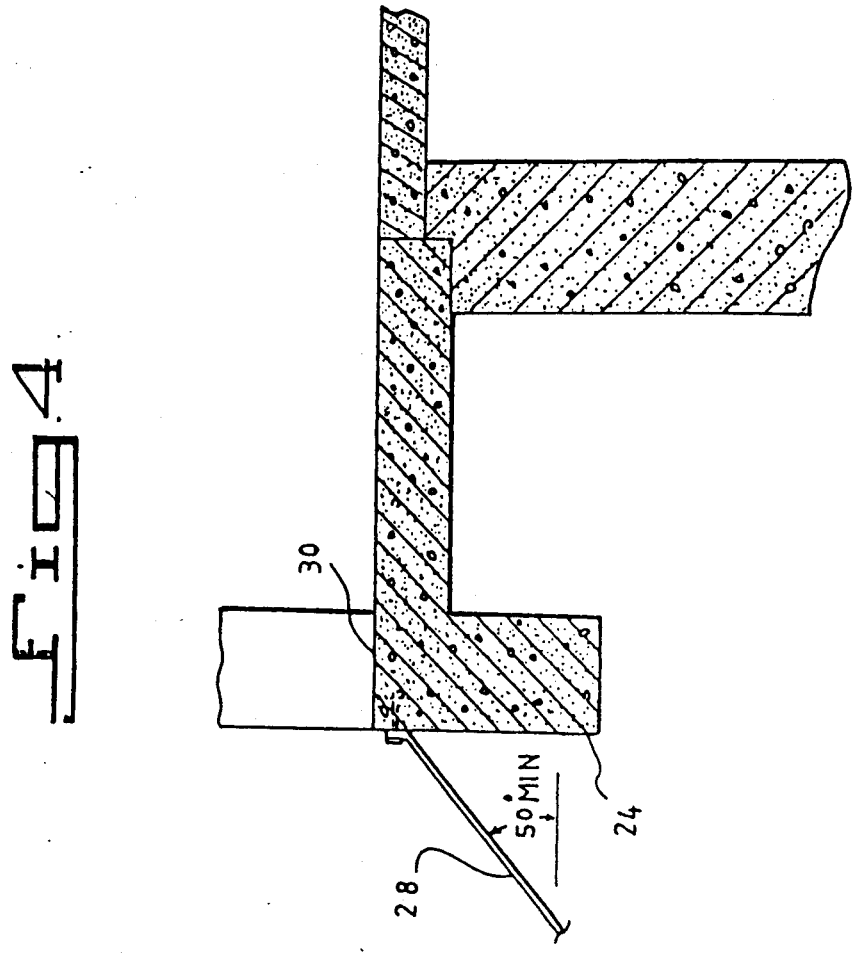
FIG. 4 is a sectional view illustrating a portion of the tipping floor and an end wall of the pit.
Figure 3:
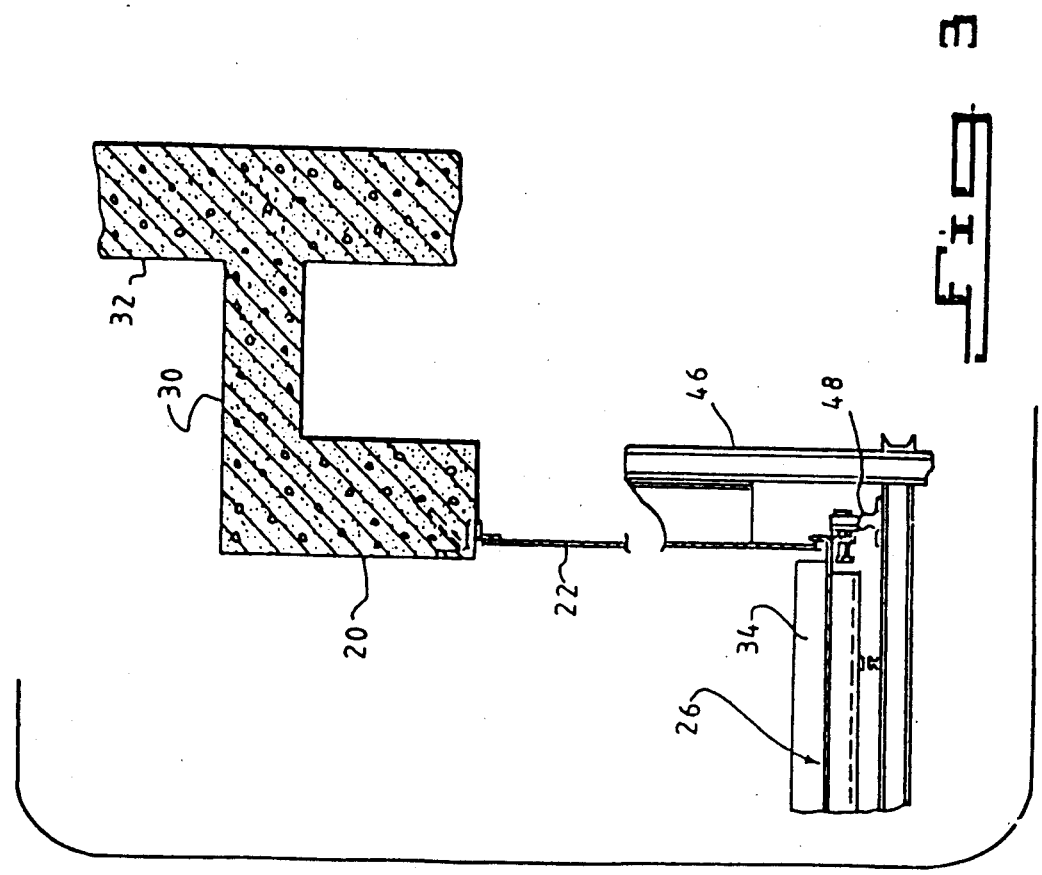
FIG. 3 is a sectional view illustrating the pit and tipping floor.

The receiving assembly 10 includes a pit 18 as best shown in FIGS. 1-3 into which solid waste material is plowed and/or pushed by wheel loaders and the like. The pit is defined by a pair of substantially vertical, parallel and opposing walls 20, vertically oriented skirtboards 22 which respectively adjoin each of the opposing walls 20 and define substantially coplanar surfaces therewith, a substantially vertical end wall 24, and a first conveyor, also called the receiving conveyor 26, which defines the bottom of the pit. Continuous strip curtains (not shown) may be lapped inside the conveyor skirtboards 22. A rearwardly extending skirtboard 28 secured to the end wall 24 of the pit extends downwardly towards the receiving conveyor 26. It preferably forms an angle of about fifty degrees or greater with respect to the horizontal plane.

A tipping floor 30 is provided about the opening to the pit for supporting the wheel loaders which may enter the receiving building. A pair of side walls 32 extend upwardly from the tipping floor 30 and diagonally with respect to the opposing walls of the pit.

The dimensions of the pit, receiving conveyor 26, and diagonal side walls 32 are not critical. The distance from the tipping floor to the lowest surface of the receiving conveyor may, for example, be between five and twenty feet. The conveyor has nearly the same width as the pit, which may be about eighty inches. The side walls 32 may be about ten to fifteen feet high.

The receiving conveyor 26 is preferably inclined with respect to the horizontal plane at an angle between about 18°-20°. It is made from a plurality of interconnected steel plates and includes equally spaced flights 34 extending therefrom. Such conveyors are well known to the art. The higher end of the receiving conveyor shall hereafter be referred to as the discharge end thereof.

A heavy curtain 40 is suspended between the skirtboards 22 and extends to within about six inches of the discharge end of the receiving conveyor 26. The curtain may be made from a single sheet of synthetic rubber having a thickness of about one inch. Alternatively, two adjoining half-inch thick curtains may be employed. A one-inch thick curtain extending completely across a conveyor having about an eighty-inch width weighs between five hundred and six hundred pounds. It is accordingly capable of preventing relatively large size objects or masses of solid waste materials from falling uncontrollably from the receiving conveyor onto the infeed conveyor. It instead allows the receiving conveyor to shear off smaller portions thereof and meter them in a controlled fashion onto the infeed conveyor. An additional benefit of the curtain is that it breaks the fall of relatively heavy objects which may pass therethrough, thereby preventing such objects from falling freely from the discharge end of the receiving conveyor 26 and crashing therebelow. The curtain has sufficient flexibility that it does not act as an impenetrable barrier, thus preventing damage to the conveyor by avoiding jamming thereof. Large, unshreddable items can safely pass therethrough, and subsequently be removed manually from the infeed conveyor onto which they may be deposited.

A second conveyor, hereafter referred to as the infeed conveyor 42, conveys waste materials from the receiving conveyor 26 to a picking platform 43 and ultimately to the shredder (not shown). The infeed conveyor has a generally S-shaped configuration including a substantially horizontal front end section 42A, an upwardly inclined section 42B, a second substantially horizontal section 42C, and an upwardly inclined rear section (not shown) leading to an infeed hopper for a shredder (not shown). The first upwardly inclined section 42B of the infeed conveyor forms at least a forty degree angle with the horizontal plane. The discharge end of the receiving conveyor 26 is positioned above the first upwardly inclined section 42B of the infeed conveyor.

The infeed conveyor 42 is similar in construction to the receiving conveyor, and is comprised of a plurality of interconnected steel plates and projecting flights 44. The flights are each about one-half inch in thickness and six inches in height.

Referring to FIG. 3, the receiving conveyor 26 is shown as positioned within the pit 18. A steel support structure 46 including a pair of rails 48 is provided for supporting the receiving conveyor 26. The infeed conveyor 42 may be supported in a similar manner.

FIG. 5 illustrates the discharge end of the receiving conveyor 26 and the two front sections 42A, 42B of the infeed conveyor 42. A dribble pan 50 is positioned beneath the receiving conveyor for trapping material carryover from the discharge end of the conveyor. A closure skirtboard 52 is mounted to the leading end of the dribble pan 50 and extends toward the infeed conveyor 42.

A second, somewhat resilient curtain 54 extends between the receiving and infeed conveyors near the discharge end of the former. This lower curtain 54 is made from a synthetic rubber material and is about one inch in thickness. It is also between about two to four feet in length, which corresponds to the distance between the lower surface of the receiving conveyor and the upper surface of the infeed conveyor. The curtain 54 is supported by an L-shaped or equivalent bracket 56 which, like the skirtboard 52 and the curtain 54, extends across the full widths of the conveyors. The infeed and receiving conveyors are substantially equal in width.

About four to five inches of each end of the curtain 54 projects above and below the L-shaped bracket 56, thereby defining an upper flap 54A and a lower flap 54B. The upper flap 54A extends substantially to the path defined by the tips of the flights 34 of the receiving conveyor 26. The lower flap 4B extends to within one inch of the path defined by the tips of the flights 44 of the infeed conveyor 42. This lower flap does not deflect easily, thereby preventing the solid waste material from moving in a downward direction along the infeed conveyor.

The curtain 54 is oriented in a direction which is substantially perpendicular to the tangent line passing through the path defined by the tips of the receiving conveyor flights 4. It is also substantially perpendicular to the line passing through the flights 44 of the infeed conveyor 42. The conveyors 26, 42 are closest to each other at the line defined by the lower curtain 54. This arrangement is advantageous in that waste material moving from the receiving conveyor to the infeed conveyor will not tend to wedge between the two conveyors. The movement of the infeed conveyor at about twice the speed of the receiving conveyor also helps to prevent material from jamming. It will be appreciated that sprocket 58, shown in FIG. 5, rotates in the clockwise direction under normal operating conditions.

In operation, solid waste material is transported to the receiving building 12 by sanitation trucks or the like. The trucks are directed to the tipping floor 30 in the infeed building from where they can dump the solid waste material onto the floor for subsequent loading into the pit 18 by wheel loaders. The side walls 32, extending diagonally with respect to the longitudinal sides of the pit 18, cause each wheel loader to approach the pit diagonally from one side of the pit or the other. If after an approach by the loader in one diagonal direction some of the material tends to bridge or dam on the horizontal floor surface above the pit or in the pit above the surface of the receiving conveyor, it will be swept clean and pushed into the pit by the next approach of the loader from the opposite diagonal direction. The vertical walls 20 of the pit not only help prevent bridging or damming of the solid waste material in the pit itself, but also promote operator safety, since the narrow pit opening is too small for a loader of sufficient width to fall all the way therein. Loaders of minimum width are accordingly specified for use within the facility to reduce the possibility of a serious accident.

Solid waste material is dumped either on the rearwardly extending skirtboard 28 or directly onto the receiving conveyor 26. It is transported by the receiving conveyor 26 to the heavy upper curtain 40 suspended above the discharge end thereof. The smaller size material is able to pass through the five to eight inch space between the upper surface of the receiving conveyor 26 and the bottom edge of the curtain. Larger size items and agglomerations of material are stopped or slowed by the curtain, thereby allowing them to be subjected to the shearing forces of the receiving conveyor flights. Large items having sufficient weight are able to deflect the curtain rearwardly and thereby pass beneath it. The fall of such items onto the infeed conveyor 42 is resisted by the curtain, thereby minimizing the speed at which they impact thereupon.

The solid waste material which passes beneath the curtain 40 falls several feet to the inclined section 42B of the infeed conveyor 42. The infeed conveyor is operated at a faster speed than the receiving conveyor so that the solid waste material does not tend to accumulate beneath the discharge end of the receiving conveyor. The lower curtain 54 acts as a barrier to prevent such material from rolling down the inclined section 42B of the infeed conveyor and beneath the receiving conveyor 26. Because of the placement of the lower curtain 54 on the tangent lines passing through the lower surface of the receiving conveyor and the upper surface of the infeed conveyor, the two conveyors are substantially parallel at the points where they are closest to each other and diverge therefrom in the direction of conveyance. Thus, material falling from the receiving conveyor does not tend to wedge between the conveyors and the shear forces on such material are instead conducive to loosening and spreading out the material into a uniform, thin layer on the infeed conveyor. The material is accordingly carried up to a picking platform 43 where items unsuitable for shredding are removed. Material suitable for shredding is conveyed to a shredder (not shown). The shredded materials are subjected to a magnetic separator which removes ferrous metals and then conveyed to a boiler where they are combusted.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is;

1. A receiving assembly for a solid waste disposal system, comprising:
   a pit for receiving solid waste material;
   a substantially horizontal tipping floor defined about said pit;
   a first conveyor positioned within said pit, said first conveyor including a discharge end for discharging solid waste material which may be present on said first conveyor;
   a second conveyor, at least part of said second conveyor being positioned beneath said discharge end of said first conveyor so that waste material discharged from said first conveyor drops upon said second conveyor, each of said first and second conveyors being adapted to transport waste material in substantially the same directions; and
   a curtain positioned between said first conveyor and said second conveyor, said curtain having an upper end adjacent to a lower surface of said first conveyor and a lower end adjacent to an upper surface of said second conveyor.

2. A receiving assembly as defined in claim 1 wherein said first conveyor includes an upwardly inclined section.

3. A receiving assembly as defined in claim 2 wherein said second conveyor includes an upwardly inclined section, said discharge end of said first conveyor being positioned above part of said upwardly inclined section of said second conveyor, said upwardly inclined section of said second conveyor extending above and beyond said discharge end of said first conveyor.

4. A receiving assembly as defined in claim 1 including a heavy, deflectable curtain suspended above said first conveyor, said heavy curtain having a bottom end adjacent to the upper surface of said discharge end of said first conveyor.

5. A receiving assembly as defined in claim 1 wherein said curtain is substantially perpendicular to tangent lines tanget to said lower surface of said first conveyor and said upper surface of said second conveyor, respectively.

6. A receiving assembly as defined in claim 1 wherein each of said first and second conveyors includes a plurality of flights.

7. A receiving assembly as defined in claim 1 wherein said pit includes an upper opening and a pair of vertical side walls, said vertical side walls being substantially parallel to each other and extending between said opening and said first conveyor.

8. A receiving assembly as defined in claim 7 including a substantially horizontal tipping floor defined about said opening to said pit, a first wall extending upwardly from said tipping floor and diagonally with respect to one of said vertical side walls of said pit, and a second wall extending upwardly from said tipping floor and diagonally with respect to the other of said vertical side walls of said pit.

9. A receiving assembly as defined in claim 2 wherein said first conveyor is upwardly inclined in its entirety and defines an angle of between about eighteen to twenty degrees with the horizontal plane.

10. A receiving assembly as defined in claim 3 including a heavy deflectable curtain suspended above said first conveyor, said heavy curtain having a bottom end adjacent to the upper surface of said discharge end of said first conveyor.

11. A receiving assembly as defined in claim 10 wherein said pit includes an upper opening and a pair of vertical side walls, said vertical side walls being substantially parallel to each other and extending between said opening and said first conveyor.

12. A receiving assembly as defined in claim 11 including a substantially horizontal tipping floor defined about said opening to said pit, a first wall extending upwardly from said tipping floor and diagonally with respect to one of said vertical side walls of said pit, and a second wall extending upwardly from said tipping floor and diagonally with respect to the other of said vertical side walls of said pit.

13. A receiving assembly as defined in claim 1 wherein the lower surface of said discharge end of said first conveyor is at least about two feet from the upper surface of said second conveyor closest thereto.

14. A receiving assembly as defined in claim 4 wherein the lower surface of said discharge end of said first conveyor is at least about two feet from the upper surface of said second conveyor.

15. A receiving assembly as defined in claim 1 wherein said pit includes an upper opening, and a downwardly inclined skirt board extending between said upper opening and said first conveyor.

16. A receiving assembly as defined in claim 1 wherein said second conveyor includes an end section positioned beneath said discharge end of said first conveyor and an upwardly inclined section integral with said end section positioned partially beneath said discharge end of said first conveyor and projecting beyond and above said discharge end of said first conveyor.

17. A receiving assembly as defined in claim 16 wherein said first conveyor includes a upwardly inclined section.

18. A receiving assembly as defined in claim 17 wherein said upwardly inclined section of said second conveyor forms a higher angle with the horizontal plane than said upwardly inclined section of said first conveyor.

19. A receiving conveyor as defined in claim 17 including a heavy curtain suspended above said discharge end of said first conveyor and having an end adjacent to said discharge end.

20. A receiving assembly for a solid waste disposal system, comprising:
   a pit for receiving solid waste material, said pit including an upper opening;
   a substantially horizontal tipping floor defined about said upper opening to said pit;
   a first conveyor positioned within said pit, said first conveyor including a discharge end for discharging solid waste material which may be present on said first conveyor;
   a second conveyor, at least part of said second conveyor being positioned beneath said discharge end of said first conveyor so that waste material discharged from said first conveyor drops upon said second conveyor;
   a downward inclined skirt board extending between said upper opening and said first conveyor; and
   said pit including a pair of opposing walls and an end wall connecting said opposing walls, said first conveyor being positioned between and adjoining said opposing walls, said skirt board extending from said end wall to said first conveyor.

* * * * *